United States Patent
Yoshida et al.

(10) Patent No.: US 9,107,380 B2
(45) Date of Patent: Aug. 18, 2015

(54) RACK APPARATUS FOR MANAGING LABORATORY ANIMAL

(75) Inventors: Kazuya Yoshida, Osaka (JP); Yuichi Miura, Osaka (JP)

(73) Assignee: Dai-Dan Co., Ltd., Osaka (JP)

( * ) Notice: Subject to any disclaimer, the term of this patent is extended or adjusted under 35 U.S.C. 154(b) by 26 days.

(21) Appl. No.: 13/807,198

(22) PCT Filed: Jun. 7, 2011

(86) PCT No.: PCT/JP2011/063002
§ 371 (c)(1),
(2), (4) Date: Dec. 27, 2012

(87) PCT Pub. No.: WO2012/002112
PCT Pub. Date: Jan. 5, 2012

(65) Prior Publication Data
US 2013/0098305 A1 Apr. 25, 2013

(30) Foreign Application Priority Data

Jun. 29, 2010 (JP) ................................. 2010-147970

(51) Int. Cl.
*A01K 1/03* (2006.01)
*A01K 1/00* (2006.01)

(52) U.S. Cl.
CPC ............... *A01K 1/0047* (2013.01); *A01K 1/031* (2013.01)

(58) Field of Classification Search
CPC ....... A01K 1/031; A01K 1/03; A01K 1/0227; A01K 31/005; A01K 1/0047
USPC .......... 119/417, 418, 420, 455; 211/134, 153, 211/71.01, 85.17, 4
IPC ................................................. A01K 1/02,1/03
See application file for complete search history.

(56) References Cited

U.S. PATENT DOCUMENTS 4,771,900 A * 9/1988 Leoncavallo et al. ........... 211/84
7,467,602 B2 * 12/2008 Yoshida ........................ 119/419

FOREIGN PATENT DOCUMENTS

JP 2-19356 8/1990
JP 09047176 A * 2/1997 ............... A01K 1/03

(Continued)

OTHER PUBLICATIONS

Machine translation of JP 2000-60342 to Muraoka, published Feb. 29, 2000 (cited on IDS dated Mar. 25, 2013).*
Machine translation of JP 09047176 to Natsume, published Feb. 1997.*
Machine translation of JP 09047177 to Natsume, published Feb. 1997.*

(Continued)

*Primary Examiner* — Kathleen Alker
(74) *Attorney, Agent, or Firm* — Clark & Brody

(57) ABSTRACT

A rack apparatus for managing laboratory animals and is easy to clean includes a plurality of animal cages (1) stored at intervals in a storage space (16) on a shelf plate (15) supported by frame structure (13). The rear of the storage space (16) is closed by a back plate (12b), the exhaust box (19) is installed at the top of the rear side, and a cage top cover (23) is installed at the top of the front side. A back stay (25) is demountably attached to the back plate (12b), a movement-restricting bar (27) is attached to the back stay (25), and spacers (29), which maintain intervals between the animal cages (1), are demountably attached to the back stay (25). The spacers (29) are selectively installed by mounting to/dismounting from the back stay (25) to maintain planned storage positions corresponding to sizes of the cages (1) in the width direction.

6 Claims, 8 Drawing Sheets

(56) References Cited

FOREIGN PATENT DOCUMENTS

| | | | | |
|---|---|---|---|---|
| JP | 09047177 A | * | 2/1997 | ............... A01K 1/03 |
| JP | 10286037 A | * | 10/1998 | ............... A01K 1/03 |
| JP | 2000-060342 | | 2/2000 | |
| JP | 2000270703 A | * | 10/2000 | ............... A01K 1/03 |
| JP | 4191565 | | 9/2008 | |
| JP | 2010-041978 | | 2/2010 | |
| WO | 2006/044708 | | 4/2006 | |

OTHER PUBLICATIONS

Machine translation of JP 10286037 to Kasai et al., published Oct. 1998.*

Machine translation of JP 2000270703 to Muraoka, published Oct. 2000.*

* cited by examiner

RACK APPARATUS FOR MANAGING LABORATORY ANIMAL

TECHNICAL FIELD

The present invention relates to a rack apparatus for managing laboratory animals and particularly to a rack apparatus for managing laboratory animals used for rearing small-sized laboratory animals such as a mouse used for development of pharmaceuticals, various medical experiments, verifications and the like.

BACKGROUND ART

Small animals for experiments such as mouse, rat, guinea pig, hamster and the like used in various medical experiments, verifications and the like have been reared in a well-equipped laboratory animal managing room for sufficient management against bacterial infection to the laboratory animals or bacterial spread from the laboratory animals.

In a prior-art laboratory animal managing room, the laboratory animals are reared in a rack apparatus for managing laboratory animals in order to protect the laboratory animals from microorganism infection such as bacteria or to prevent spread of the microorganism such as bacteria from the laboratory animal managing room to the outside. The prior-art laboratory animal managing rack apparatus include the inventions disclosed in Patent Literatures 1 and 2.

In the animal managing rack disclosed in Patent Literature 1, a cage for rearing a small animal is arranged between upper and lower shelf plates, suspended walls, each having an I-shaped section are juxtaposed on the side on a lower face of the shelf plate, and an air outlet communicating with an air discharge chamber is formed in a rear surface of the animal managing rack between these suspended walls. The rearing cage has a flange portion of an open upper peripheral edge portion hooked by a lower locking piece on the suspended wall and suspended or is directly placed on the shelf plate so that the flange portion and the lower locking piece are slightly spaced apart and accommodated in the animal rearing rack.

On the other hand, the rack apparatus for managing laboratory animals disclosed in Patent Literature 2 has a space portion between the upper and lower shelf plates as a cage accommodation portion similarly to the animal managing rack described in Patent Literature 1, and a cage for rearing a small animal is arranged in the cage accommodation portion, and this invention is characterized in that when the rearing cage is arranged in the cage accommodation portion, a cage upper cover is installed on an upper part on the front face side so as to be close to an open upper surface of the rearing cage while leaving a gap through which air can be supplied, and moreover, on the upper part on the rear face side of the cage accommodation portion, a box-shaped air discharge portion communicating with the air discharge chamber of an air-discharge box device mounted on the rear face side of the rack device is provided, and an air-outlet forming body is attached to this air discharge portion and is configured so that, when the rearing cage is arranged in the cage accommodation portion, the air outlet of the air-outlet forming body advances into the rearing cage.

PRIOR-ART REFERENCES

Patent Literature

Patent Literature 1: Japanese Patent No. 4191565
Patent Literature 2: Japanese Patent Laid-Open No. 2010-041978

SUMMARY OF THE INVENTION

Problems to be Solved by the Invention

In Patent Literature 1, a method for arranging the rearing cage having the upper face open on a shelf between the upper and lower shelf plates (rearing cage accommodation portion) in the animal managing rack is described as described such that the flange portion formed on the open upper peripheral edge portion of the rearing cage is placed on the lower locking piece in the I-shaped suspended wall and suspended by being pushed into a predetermined position, whereby air in the rearing cage accommodation portion in the animal managing rack is sucked through the air outlet by discharging the air in the air discharge chamber, a pressure inside of the animal managing rack becomes negative, and the air in the rearing cage is sucked into the air discharge chamber through the air outlet without going out of the animal managing rack (into the managing room where the animal managing rack is installed) and at the same time, purified air supplied into the managing room goes into the rearing cage.

However, with the invention described in Patent Literature 1, since a width in the lateral direction of each cage accommodation portion (space) is regulated by the I-shaped suspended wall installed on the both side portions thereof, there is only one type of the rearing cage that can be accommodated in the cage accommodation portion that matches the lateral width of the cage accommodation portion, and there is a problem that a rearing cage having a width dimension larger or smaller than the lateral width of the cage accommodation portion cannot be accommodated. Moreover, in the animal managing rack described in Patent Literature 1, the circular air outlet having the air discharge chamber installed on the rear surface side of the shelf plate communicate with the cage accommodation portion is formed in a plate material on the air discharge chamber front surface side, but since this air outlet is a small opening arranged at a predetermined interval in the lateral direction, if the surface of the plate material on the air discharge chamber front surface side is stained, it can be cleaned only from the front surface side through which the rearing cage is put in/out and thus, there is another problem that it is difficult to keep a wall on the depth of the cage accommodation portion, that is, the peripheral surface of the air outlet in the plate material on the air discharge chamber front surface side clean.

On the other hand, in the case of the rack device for rearing laboratory animals described in Patent Literature 2, since there is no structural portion like the suspended wall regulating the lateral width of the cage accommodation portion as in the invention of Patent Literature 1, various rearing cages with different lateral width dimensions can be juxtaposed on the shelf plate and accommodated. However, with the invention in Patent Literature 2, since there is no structural portion regulating the lateral width of the cage accommodation portion, there is a problem that the rearing cage accommodated on the shelf plate might shift in the lateral direction due to wobble of a building and the like and also there is another problem that cleaning in the box-shaped air discharge portion is difficult. Usually, since the air discharge box device installed on the rear surface side of the rack main body is configured such that a wall plate on the rear surface side thereof can be removed, the inside of the air discharge chamber can be easily cleaned by removing the rear face plate, but since the vertical interval in the box-shaped air discharge portion is extremely small, a worker needs to insert the hand when the inside of the air discharge portion is to be cleaned from the air discharge chamber side, and thus, the cleaning work is extremely difficult.

The present invention was made in order to solve the above prior-art problems and has an object to provide a rack apparatus for managing laboratory animals which can accommodate rearing cages with different width dimensions arranged side by side as a shelf plate state, the rearing cages do not shift in the width direction and the longitudinal direction on the shelf plate even by wobble of the rack apparatus and the like and moreover, the air discharge box for making the air inside the rearing cage flow to the air discharge chamber can be cleaned easily.

Means for Solving the Problems

The present invention is a rack apparatus for managing laboratory animals including a rack main body accommodating a rearing cage containing a small animal for experiments and an air discharge chamber for discharging air in the rearing cage accommodated in this rack main body, characterized in that the rack main body is provided with at least one shelf plate extending in a width direction of the rack main body, an accommodation space portion defined on the shelf plate so that a plurality of the rearing cages can be inserted from the front side to the rear side of the rack main body and can be juxtaposed in the width direction of the shelf plate and stored, a rear surface plate for closing the rear side of the accommodation space portion, a spacer detachably attached to the rack main body in the rear side of the accommodation space portion, for positioning the plurality of the rearing cages accommodated in the accommodation space portion at predetermined intervals in the right and left width directions orthogonal to the front and rear directions and for regulating movement in the width direction, a plurality of attaching portions for detachably attaching the spacer to the rack main body, and an air discharge box installed on an upper part on the rear side in the accommodation space portion and provided with an air outlet opened in the accommodation space portion, and the air discharge box communicates with the air discharge chamber.

In an embodiment of the rack apparatus for managing laboratory animals according to the present invention, the rack main body is provided with a backstay extending in the width direction of the accommodation space portion and detachably attached to the rear surface plate, the attaching portion is formed on the backstay, and the spacer is detachably attached to these attaching portions.

In another embodiment of the rack apparatus for managing laboratory animals according to the present invention, the rack main body is provided with a movement limiting member attached to the backstay so as to be brought into contact with the rearing cage to be accommodated in the accommodation space portion and to regulate movement of the rearing cage in a direction from the front side to the rear side and to arrange the rearing cage at a fixed position.

In still another embodiment of the rack apparatus for managing laboratory animals according to the present invention, the rear surface plate constituting the rack main body is a wall plate of a casing forming the air discharge chamber, the rear side of the air discharge box is connected to the wall plate of the air discharge chamber, and at least a part of an opening peripheral portion which is a connection portion between the air discharge box and the air discharge chamber is formed as an inclined face so as to expand from the air discharge box toward the air discharge chamber.

In still another embodiment of the rack apparatus for managing laboratory animals according to the present invention, the rack main body is provided with a pressing bar extending in the width direction of the accommodation space portion in order to prevent jumping out of the rearing cage accommodated in the accommodation space portion from the front side, and this pressing bar is attached to the rack main body capable of turning by having each of the both end portions rotatably supported by a fixing portion located on both outer side portions in the width direction in the rack main body.

In still another embodiment of the rack apparatus for managing laboratory animals according to the present invention, to the rack main body, a cage upper cover is attached which is arranged close to the open upper face on the front side from the air discharge box and has a gap through which air can be supplied left between itself and an open upper face of the rearing cage accommodated in the accommodation space portion.

Advantages of the Invention

According to the rack apparatus for managing laboratory animals of the present invention, since the spacer for holding mutual intervals between the plurality of the rearing cages juxtaposed in the width direction and accommodated in the accommodation space portion on the shelf plate and for regulating movement of each rearing cage in the width direction is detachably attached to the rack main body on the rear side of the accommodation space portion, the plurality of the rearing cages with different lateral width dimensions can be accommodated in the accommodation space portion on one shelf plate in a mixed manner by switching the spacer at an optimal position. Moreover, the plurality of the rearing cages juxtaposed and accommodated in the accommodation space portion can be prevented from moving in the lateral direction of each rearing cage by the spacer even if the rack device wobbles.

According to the rack apparatus for managing laboratory animals of the present invention, since the backstay is detachably installed on the rear surface plate and the attaching portion for detachably installing the spacer is provided on this backstay, the work for changing the attached position of the spacer can be performed extremely easily. Moreover, by preparing backstays installing the spacer attaching portions at positions corresponding to rearing cages with different lateral widths in advance, the several types of the rearing cages with different lateral widths can be accommodated in the accommodation space portion only by changing the backstay.

Moreover, according to the rack apparatus for managing laboratory animals of the present invention, since the rack main body is provided with the movement limiting member, when the rearing cage is inserted into the accommodation space portion of the rack main body from the front side, the rear side of the rearing cage is brought into contact with the movement limiting member, and the rearing cage can be arranged at a predetermined position in the front-and-rear direction with respect to the accommodation space portion.

Moreover, according to the rack apparatus for managing laboratory animals of the present invention, by installing the air discharge chamber in close contact with the rear side of the rack main body, the rear surface plate closing the rear side of the accommodation space portion can be composed of the wall plate of the casing forming the air discharge chamber, whereby the air discharge box can be directly connected to the air discharge chamber. Moreover, since at least a part of an opening peripheral portion which is a connection portion between the air discharge box and the air discharge chamber is formed as an inclined face so as to expand from the air discharge box toward the air discharge chamber, a worker can easily insert the hand into the air discharge box through the opening which is a connection portion between the air discharge box and the air discharge chamber when the inside of the air discharge box is to be cleaned by removing the rear-side wall plate of the air discharge chamber, and as a result, the cleaning of the inside of the air discharge box can be performed easily and rapidly without causing an injury or the like to the worker.

Moreover, according to the rack apparatus for managing laboratory animals of the present invention, since the pressing bar is attached to the front side of the rack main body, the plurality of the rearing cages stored in the accommodation space portion do not jump out to the front side due to wobble of the rack main body and the like but can be stored safely. Moreover, since the pressing bar is composed of a rod-shaped member and the both ends of this rod-shaped member are rotatably supported on the both outer side portions in the width direction of the rack main body, the plurality of the rearing cages stored in the accommodation space portion can be pressed at the same time.

Furthermore, according to the rack apparatus for managing laboratory animals of the present invention, since the cage upper cover is attached which is arranged close to the open upper face on the front side from the air discharge box and has a gap through which air can be supplied left from an open upper surface of the rearing cage accommodated in the accommodation space portion, the polluted air in the rearing cage is sucked and discharged efficiently through an air discharge hole of the air discharge box toward the air discharge chamber, whereby pressure in the rearing cage becomes negative and clean air in the laboratory animal managing room enters through a slight gap through which the air can be supplied between the open upper surface of the rearing cage and the cage upper cover and thus, the air in the cage is efficiently ventilated and moreover, since the cage upper cover is arranged close to the open upper surface of the cage main body so that the gap through which the air can be supplied is formed, spread of a bad odor in the laboratory animal managing room can be prevented and moreover, since there is no need to attach an opening/closing door to the rack main body, taking in/out of the rearing cage with respect to the accommodation space portion is extremely easy, and work efficiency can be considerably improved.

BEST MODE FOR CARRYING OUT THE INVENTION

Figure 1:
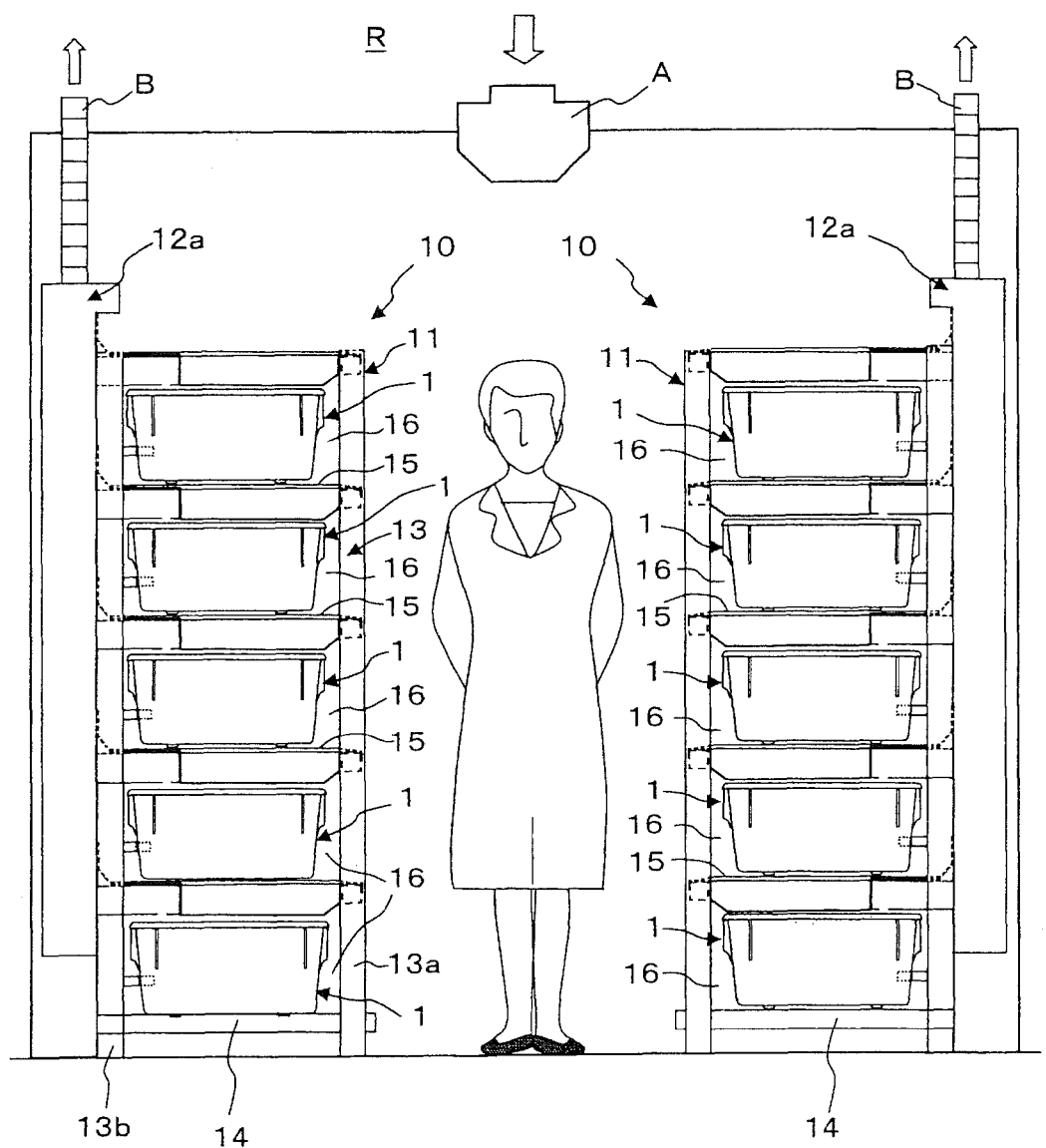
FIG. 1 is a configuration explanatory diagram illustrating an outline of a rack apparatus for managing laboratory animals according to one embodiment of the present invention in a state installed in a laboratory animal managing room.

A rack apparatus for managing laboratory animals according to the present invention (hereinafter referred simply as a "rack apparatus") will be described below in more detail by referring to the attached drawings illustrating its preferred embodiments. A rack apparatus 10 according to a preferred embodiment of the present invention is, as illustrated in FIG. 1 in an outlined manner, installed in a laboratory animal managing room R, and an administrator managing laboratory animals usually performs a managing work in this laboratory animal managing room R. On a ceiling of this laboratory animal managing room R, an indoor outlet A for air conditioning is provided, and from this indoor outlet A, clean air at predetermined temperature and humidity controlled at predetermined temperature and humidity by an air conditioner (not shown) installed outside the room and dust-removed and disinfected by an air cleaner (not shown) or the like is supplied.

This rack apparatus 10 is composed of, as illustrated in FIGS. 1 to 4, a rack main body 11 and an air discharge chamber 12a installed substantially integrally on this rack main body 11. The rack main body 11 is composed of a frame structural body 13 formed of a front side (right side when seen in FIG. 3) through which a rearing cage 1 is taken in/out with respect to a predetermined accommodation position of the rack main body 11, columns 13a and 13b arranged right and left on the rear side (left side when seen in FIG. 3) opposite to this front side, respectively, and extending in the perpendicular direction (vertical direction), and a plurality of lateral beams 13c extended between the right and left columns 13a and 13b at least on the front side and the rear side, respectively, and extending in a horizontal direction (lateral direction). The front side of the rack main body 11 is left open for taking in/out of the rearing cage 1 with respect to the predetermined accommodation position as described above, but the rear side is closed by a rear surface plate.

Figure 3:
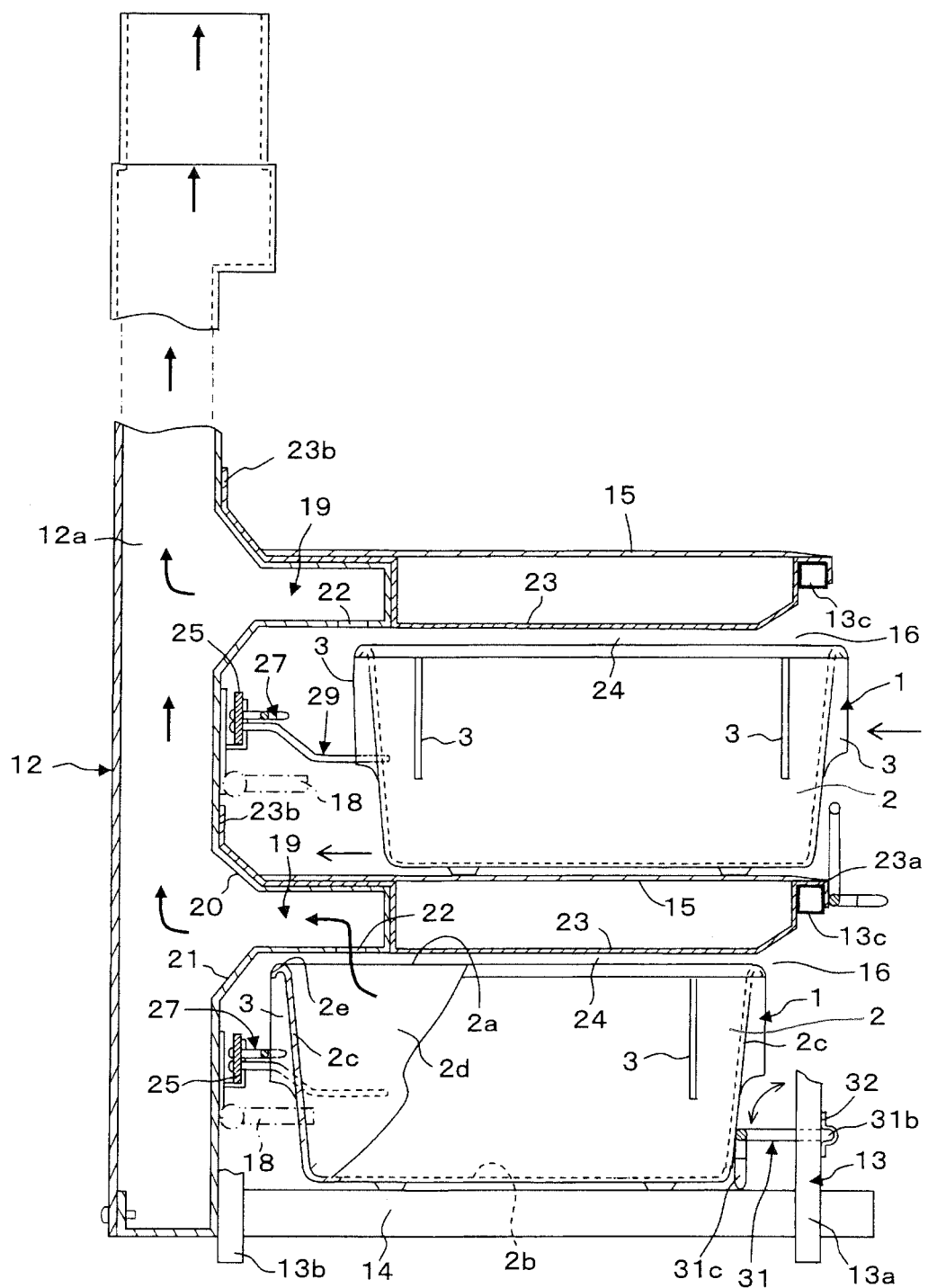
FIG. 3 is a sectional view illustrating a part of the rack apparatus for managing laboratory animals in a cut-away state in 3-3 line in FIG. 2.
Figure 4:
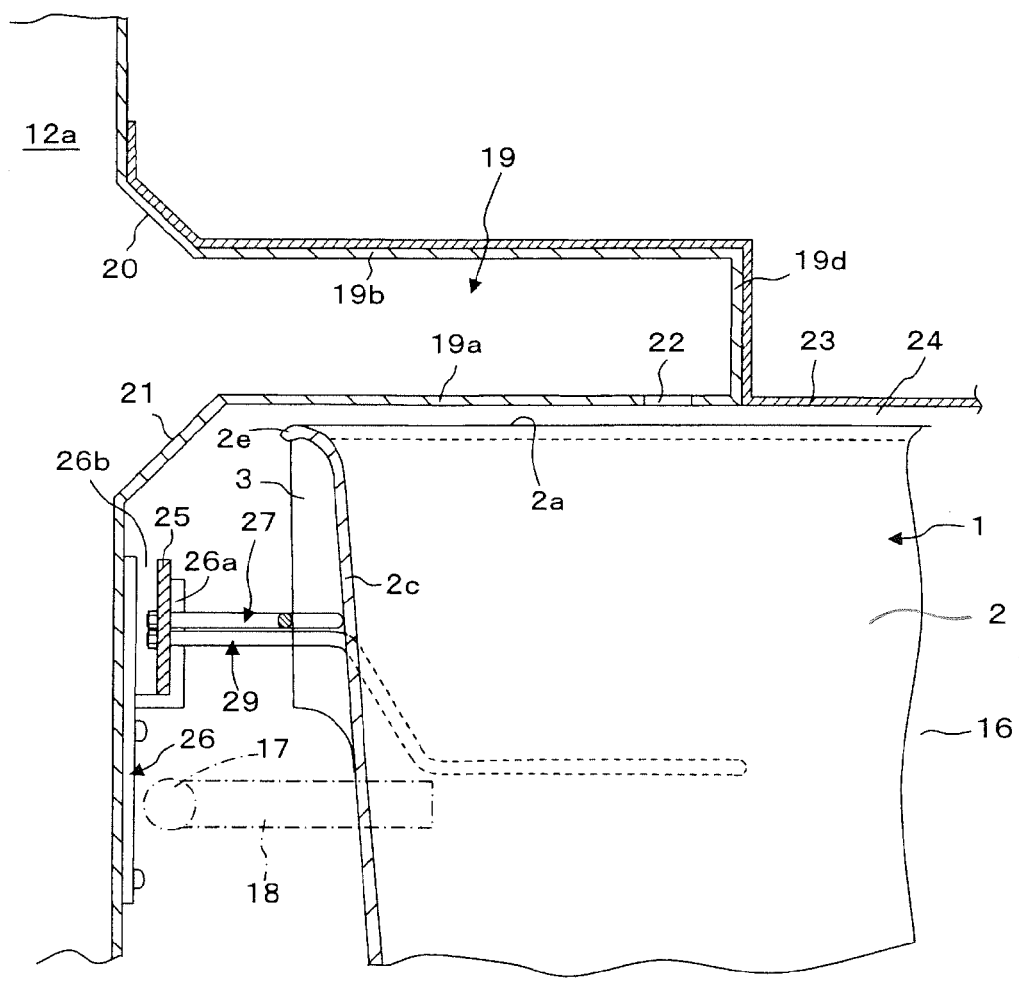
FIG. 4 is a partial sectional view illustrating a part of the rack apparatus for managing laboratory animals illustrated in FIG. 3 in a more enlarged manner.
Figure 5:
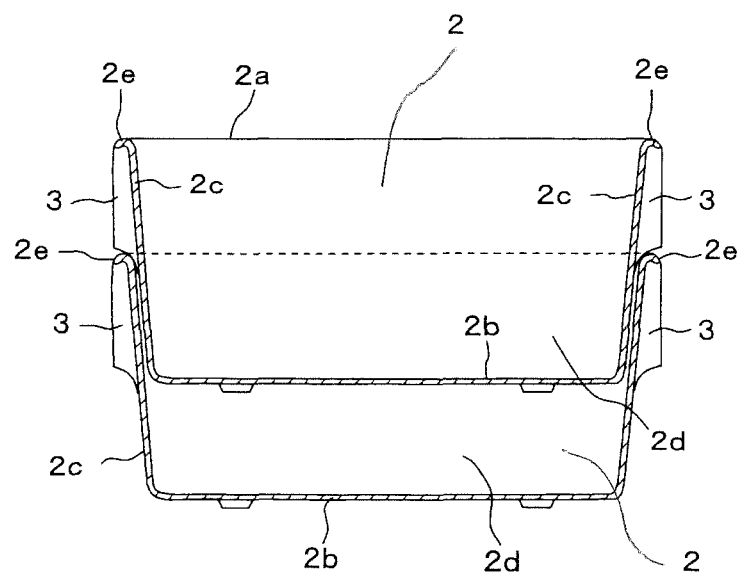
FIG. 5 is a sectional view illustrating a state where the rearing cages are stacked.

In this embodiment, the rear surface plate is composed of a wall plate 12b of a casing 12 forming the air discharge chamber 12a installed in the rear of the rack main body 11, that is, in close contact with the rear side of the frame structural body 13. The air discharge chamber 12a formed by the casing 12 is connected to an air discharge fan (not shown) installed outdoors by an air discharge duct B (See FIG. 1) in an upper portion thereof, and air sucked into the air discharge chamber 12a is discharged to the outside of the laboratory animal managing room R by the air discharge fan. The rearing cage 1 is composed of a box-shaped cage main body 2 provided with an open and substantially rectangular upper face 2a as illustrated in FIGS. 3 to 5. That is, the cage main body 2 is formed of a square bottom plate 2b slightly smaller than the open upper face 2a, front and rear walls 2c diagonally rising from each edge portion on the front side and the rear side of this bottom plate 2b, and side walls 2d diagonally rising from both side edge portions of the bottom plate 2b and presents an inverted trapezoidal shape when seen from the side.

On a peripheral edge portion of the open upper face 2a in the cage main body 2, a flange 2e extending from an upper end of each wall portion to the outer direction substantially in parallel with the bottom plate 2b is formed. This flange 2e has a function of reinforcing the open upper face 2a of the cage main body 2 and is also used as a grasping portion when the rearing cage 1 is to be carried. On each outer face of the front and rear walls 2c and the side walls 2d of the cage main body 2, two strip-shaped stacks 3 each, that is, eight stacks in total are provided. Specifically, the cage main body 2 has four corners, and the stack 3 is provided on the front and rear walls 2c and the side walls 2d close to each corner and on the both sides thereof as obvious from FIGS. 2 and 3, one of side portion end faces of each stack 3 is fastened to the wall face of the cage main body 2, while an upper portion end face is fastened to a lower face of the flange 2e. A height of the stack 3 protruding from the wall faces 2c and 2d of the cage main body 2 matches the extending length of the flange 2e extending from the peripheral edge portion of the open upper face 2a.

The lower portion end face of the stack 3 is formed having a shape fitting with the upper face shape when the flange 2e is seen on a longitudinal section. The rearing cage 1 might be stacked so that another rearing cage 1 is nested in one rearing cage 1 when not in use as illustrated in FIG. 5. In such a case, if a close contact force between the front and rear walls 2c and between the side walls 2d of the mutually stacked rearing cages 1 is too strong, it becomes difficult to remove them, and further nesting is prevented by placing the lower portion end face of the stack 3 formed on the cage main body 2 of the upper-side rearing cage 1 on the flange 2e of the lower-side rearing cage 1 before such situation is caused. The stack 3 also has a function of reinforcing the flange 2e and of improving strength of the wall faces 2c and 2d in addition to the above-described function. Such rearing cage 1 can be formed integrally with a synthetic resin material and the like.

The rack main body 11 is provided with a bottom plate 14 provided on a lowermost part in a region surrounded by the four columns 13a and 13b by being connected to these columns 13a and 13b or the like and a shelf plate 15 supported by each of the columns 13a and 13b on the front side and the rear side and the lateral beam 13c described above. The shelf plate 15 is installed above in plural with a dimension larger than the height dimension of the rearing cage 1 from the bottom plate 14. As a result, a space in which the rearing cage 1 is placed is ensured between the bottom plate 14 and the shelf plate 15 and between the shelf plate 15 and the shelf plate 15 above that, and this space is an accommodation space portion 16 for accommodating the rearing cage 1. A lateral width of the accommodation space portion 16 when the rack main body 11 is seen from the front side thereof is such that a plurality of the rearing cages 1 can be juxtaposed at predetermined intervals and therefore, the accommodation space portion 16 refers to all the spaces in the right and left directions on the bottom plate 14 and on each of the shelf plates 15.

Figure 2:
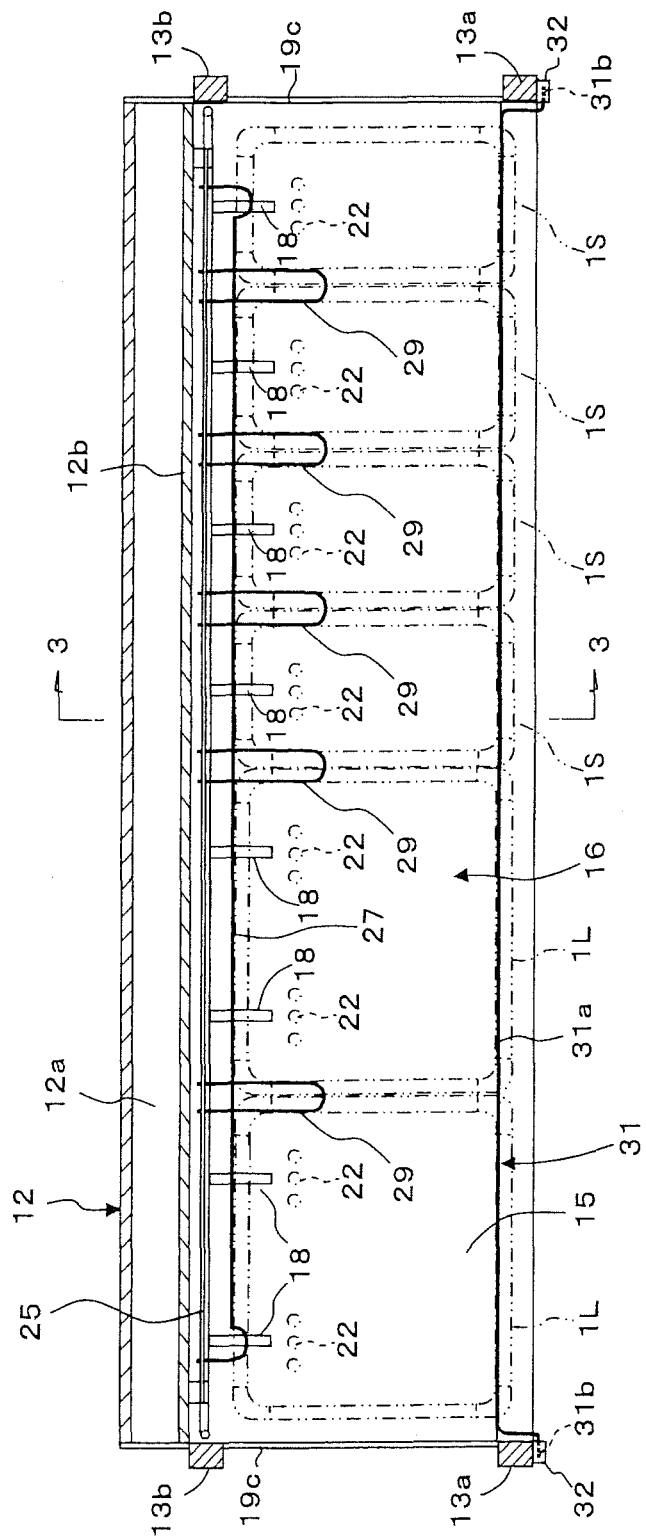
FIG. 2 is a plan view illustrating an outline of a part of the rack apparatus for managing laboratory animals in a state where a plurality of rearing cages with different width dimensions are aligned in an accommodation space portion on a shelf plate.

In FIG. 2, two types of the rearing cages 1 having different sizes are juxtaposed at predetermined intervals in the lateral direction and accommodated in the accommodation space portion 16 on one shelf plate 15. The difference in the size of these two types of the rearing cages 1 is made only in the dimension of the lateral width, and the dimension of the longitudinal width corresponding to the front-and-rear direction of the rack main body 11 when being arranged in the accommodation space portion 16 is the same. For convenience, the rearing cage having a larger lateral width dimension is indicated by reference character 1L, while the rearing cage having a smaller lateral width dimension is indicated by reference character is in FIG. 2 for discrimination. As obvious from FIG. 2, the larger rearing cage 1L has a lateral width dimension substantially twice of the smaller rearing cage 1S.

Therefore, when being accommodated in the accommodation space portion 16, an occupied portion of the shelf plate 15 by the larger rearing cage 1L corresponds to two portions of the smaller rearing cage 1S.

In the accommodation space portion 16 of such rack main body 11, a water feed pipe 17 for drinking water is installed on the rear surface plate thereof, and this water feed pipe 17 is connected to an appropriate water supply source (not shown). To the water feed pipe 17, a plurality of water drinking plugs 18 are attached, and each of the water drinking plugs 18 is installed at an expected accommodation position where the smaller rearing cage 1S is accommodated in the accommodation space portion 16. That is, the water drinking plug 18 is for providing drinking water to an animal reared in the cage main body 2 of the rearing cage 1, and a receiving port (not shown) into which this water drinking plug 18 is fitted is provided on the rear wall 2c of the cage main body 2. As a result, when the smaller rearing cage 1S is accommodated at the expected accommodation position of the accommodation space portion 16, the water drinking plug 18 is inserted into the receiving port formed on the rear wall 2c of the cage main body 2 and protrudes into the cage main body 2.

The animal in the cage main body 2 drinks water flowing out by licking a water feed valve (not shown) provided at a distal-end outlet of the water drinking plug 18. In the case of the larger rearing cage 1L, two portions of the expected accommodation positions, each accommodating the smaller rearing cage 1S, are used as described above. Therefore, there are two water drinking plugs 18 at the expected accommodation position for the larger rearing cage 1L. However, in the case of the larger rearing cage 1L, the number of laboratory animals to be contained is also usually large, and receiving ports (not shown) are provided at portions corresponding to each of the water drinking plugs 18. Therefore, if the larger rearing cage 1L is accommodated at the expected accommodation position in the accommodation space portion 16, the two water drinking plugs 18 are inserted into the rearing cage 1L from each of the corresponding receiving ports.

Subsequently, in this rack main body 11, an air discharge box 19 and a cage upper cover 23 are provided immediately above the accommodation space portion 16. The air discharge box 19 is provided closer to the rear side of the rack main body 11 as obvious from FIGS. 3 and 4 and along the accommodation space portion 16 extending in the lateral direction and immediately above that. The air discharge box 19 is composed of wall plates such as a bottom plate 19a located immediately above the accommodation space portion 16, a top plate 19b located above that, opposing side plates 19c, and an end plate 19d closing the front side, and the air discharge box 19 formed by these wall plates presents a rectangular horizontal sectional shape, and a rectangular open portion oriented to the rear side thereof is connected to an opening portion opened in the wall plate 12b of the casing 12 forming the air discharge chamber 12a in a fitted state, and as a result, the air discharge box 19 is made to communicate with the air discharge chamber 12a.

The open portion where the air discharge box 19 communicates with the air discharge chamber 12a, that is, the rectangular opening portion formed in the wall plate 12b of the casing 12 is defined in the upper edge portion and the lower edge portion thereof by inclined plates 20 and 21 inclined so as to gradually expand from the air discharge box 19 toward the air discharge chamber 12a. Such air discharge box 19 can be formed integrally with the casing 12 by making a part of the wall plate 12b in the casing 12 forming the air discharge chamber 12a installed on the rear side of the rack main body 11 swollen toward the front side and protruded to the upper part of the accommodation space portion 16, and as a result, manufacture of the air discharge box 19 is extremely facilitated, and not only that productivity can be improved but a manufacturing cost can be lowered. As obvious from the above-described explanation, the air discharge box 19 is formed over the entire lateral width of the rack main body 11 or in other words over the entire width direction of the accommodation space portion 16, and thus, the side plate 19*c* closing the side of the air discharge box 19 is present only on the both side portions in the width direction of the rack main body 11.

The bottom plate 19*a* in the air discharge box 19 is arranged close to the open upper face 2*a* of the cage main body 2 when the rearing cage 1 is accommodated in the accommodation space portion 16 or in other words, at a position extremely close to the open upper face 2*a*. Therefore, when the rearing cage 1 is to be inserted into the accommodation space portion 16 of the rack main body 11 from the front side, the bottom plate 19*a* of the air discharge box 19 is not brought into contact with or does not touch the open upper face 2*a* of the rearing cage 1 or disturb accommodation of the rearing cage 1 in the accommodation space portion 16, but since the bottom plate 19*a* of the air discharge box 19 is located extremely close to the open upper face 2*a* of the cage main body 2, it is almost the same as the state where a part of the open upper face 2*a* in the rearing cage 1 is substantially closed. In this bottom plate 19*a*, a plurality of circular air outlets 22 are formed in portions located immediately above the cage main body 2 arranged in the accommodation space portion 16 as illustrated in FIGS. 3 and 4.

On the other hand, the cage upper cover 23 arranged immediately above the accommodation space portion 16 is a covering plate arranged at substantially the same height as the bottom plate 19*a* of the air discharge box 19, and this cage upper cover 23 is arranged at a position extremely close to the open upper face 2*a* of the rearing cage 1 arranged in the accommodation space portion 16 similarly to the bottom plate 19*a* of the air discharge box 19. As described above, the cage upper cover 23 is located at the position extremely close to the open upper face 2*a* of the rearing cage 1, but since a slight gap 24 is provided from the open upper face 2*a*, the gap 24 functions as an entrance for supplying clean air in the animal rearing room R into the rearing cage 1.

A distal end portion 23*a* on the front side in the cage upper cover 23 is bent so as to wind around the lateral beam 13*c* of the frame structural body 13 in the rack main body 11 from the front upper side and is connected to the lateral beam 13*c* as illustrated in FIG. 3. Moreover, the rear side in the cage upper cover 23 is bent along the end plate 19*d* of the air discharge box 19, stacked on the top plate 19*b*, and its rear end portion 23*b* is further brought into contact with the casing 12 of the air discharge chamber 12*a* installed on a rear face of the rack main body 11. As obvious from such configuration, the cage upper cover 23 is fixed only by a small screw or the like using the frame structural body 13 and the air discharge box 19 of the rack main body 11 and since installation and removal thereof are easy, disassembling and cleaning can be performed easily. The shelf plate 15 is arranged in a state extended between the upper face in the distal end portion 21*a* of the cage upper cover 23 winding around the lateral beam 13*c* and the portion on the rear side stacked on the top plate 19*b* of the air discharge box 19. These shelf plates 15 and the cage upper cover 23 are also installed over the entire accommodation space portion 16, that is, over the entire width of the rack main body 11 similarly to the air discharge box 19.

Figure 6:
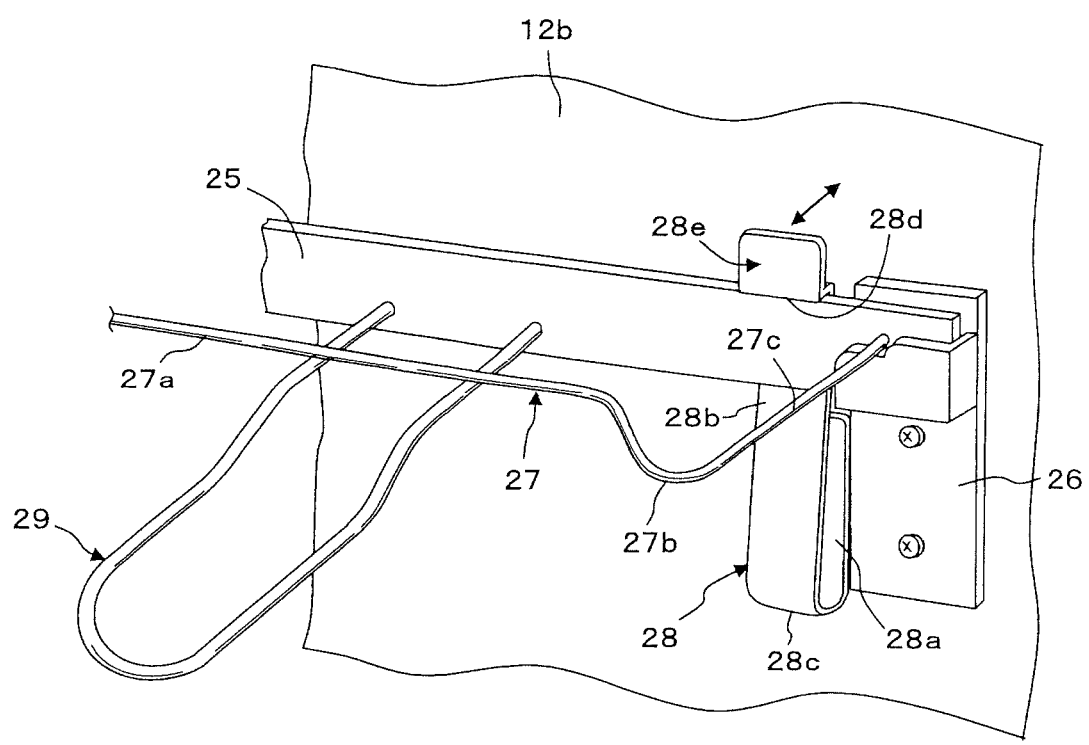
FIG. 6 is a partial perspective view illustrating a state where a backstay to which a movement regulating member and a spacer are attached is attached to a rear surface plate of the accommodation space portion in a simplified manner.
Figure 7:
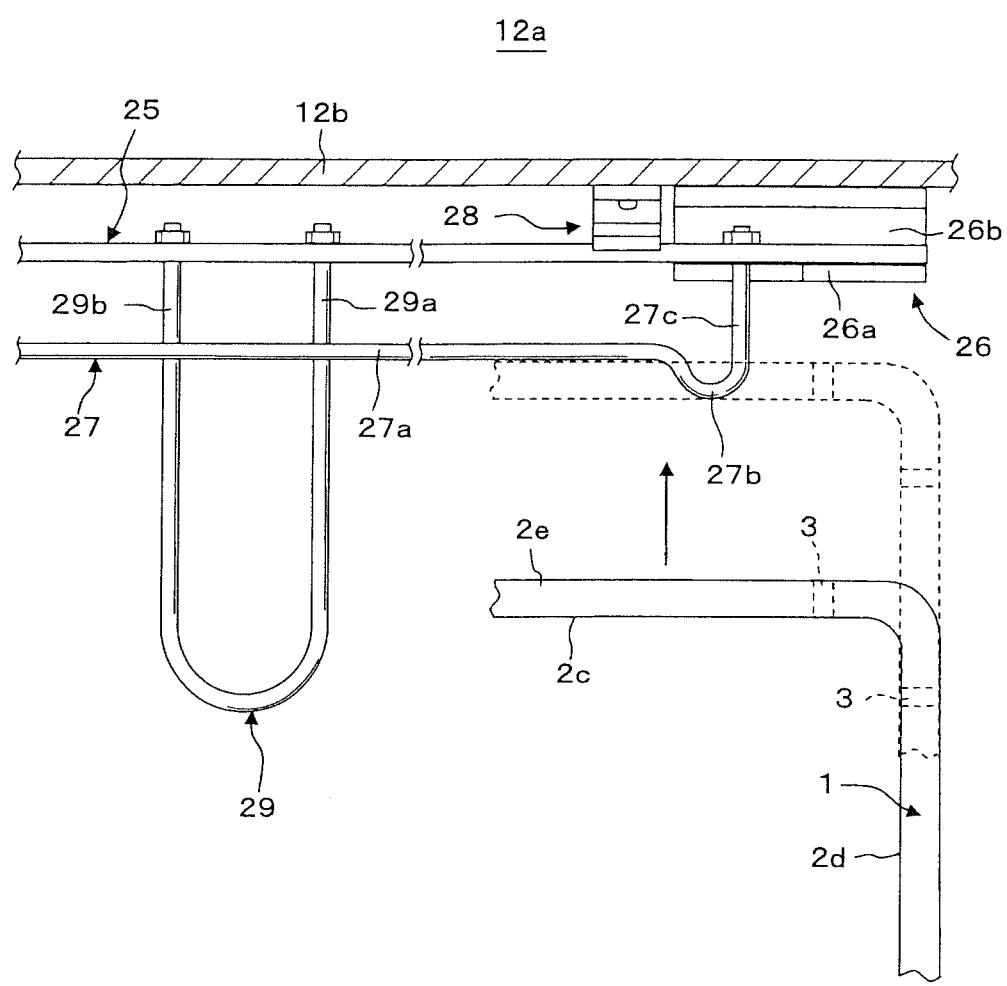
FIG. 7 is a plan view illustrating a state where the backstay to which the movement regulating member and the spacer are attached is supported by the rear surface plate.

On the wall plate 12*b* on the front side of the casing 12 in the air discharge chamber 12*a* which serves as a rear surface plate closing the rear side of the accommodation space portion 16, a backstay 25 is detachably installed. That is, the backstay 25 is a plate member having a length extending over the substantially entire width of the accommodation space portion 16 and is detachably supported by a plate-shaped mount bracket 26 attached to the both sides in the width direction of the wall plate 12*b* by a screw, respectively. The mount bracket 26 is provided with, as illustrated in FIGS. 6 and 7, a receiving portion 26*a* forming a groove portion 26*b* having an upper part open and receiving an end portion of the backstay 25 on the surface side as illustrated in FIGS. 6 and 7. The backstay 25 is supported at each of the end portions thereof by being fitted from above in the groove portion 26*b* formed in the receiving portion 26*a* of the two mount brackets 26 fixed to the both sides of the rear face plate. The width dimension of this groove portion 26*b* or in other words, the dimension of the groove width in the front-and-rear direction of the rack main body 11 is set larger than a thickness of the backstay 25 due to a problem when a movement limiting bar 27 functioning as a movement limiting member which will be described later is attached to the backstay 25 (See FIG. 7).

Thus, since it is concerned that the backstay 25 might cause rattling in the groove portion 26*b*, a pressing spring 28 is attached to the casing wall plate 12*b* of the air discharge chamber 12*a* which is a rear surface plate, adjacent to the mount bracket 26, also serving so as to prevent removal of the backstay 25 from the groove portion 26*b*. That is, the pressing spring 28 is formed by bending a band-shaped leaf spring plate in the U-shape, in which one of two opposing plate portions is formed as a fixed portion 28*a* while the other is formed as a spring portion 28*b*. The length from a bent portion 28*c* is longer in the spring portion 28*b* than in the fixed portion 28*a*, and the vicinity of an end portion on the side opposite to the bent portion 28*c* in the spring portion 28*b* is bent so as to form a stepped portion 28*d* oriented downward, and a portion including this stepped portion 28*d* to the end portion functions as a latch 28*e*. Therefore, when each end portion of the backstay 25 is inserted into the groove portion 26*b* of the receiving portion 26*a* in the mount bracket 26, the end portion of the spring portion 28*b* in the pressing spring 28 is pushed and while it is deflected toward the rear surface plate 12*b* side, the backstay 25 is put down into the groove portion 26*b* of the receiving portion 26*a*.

When the both end portions of the backstay 25 have been put in the groove portion 26*b* of the mount bracket 26, the pressing force on the latch 28*e* which is an end portion of the spring portion 28*b* is released, and then, the backstay 25 is pressed to the front side by a spring recovering force of the spring member 28*b* and pressed onto the inner wall surface of the receiving portion 26*a* in the groove portion 26*b* so as to suppress rattling. At the same time, the stepped portion 28*d* of the latch 28*e* is locked on the backstay 25, and upward movement of the backstay 25 is prevented. Such pressing spring 28 is preferably installed each in the vicinity of the mount brackets 26 attached on the both sides of the accommodation space portion 16 but one spring may be installed on the rear surface plate 12*b* in the vicinity of an intermediate portion in the width direction of the accommodation space portion 16.

This backstay 25 can be removed by only pressing the latch 28*e* of the spring portion 28*b* to the rear side and lifting it up in a state where the stepped portion 28*d* is unlocked from the backstay 25 and removing the both end portions from inside the groove portion 26*b* of the receiving portion 26*a*. To such backstay 25, a bar 27 functioning as a movement limiting member is attached. This movement limiting bar 27 is formed by bending a single metal rod into an upward U-shape having a large width. More specifically, the movement limiting bar 27 is composed of a linear first contact portion 27a extending in the width direction of the rack main body 11 along the backstay 25 as illustrated in FIG. 2, a second contact portion 27b protruding in a forward curved manner from the first contact portion 27a on the both sides of this first contact portion 27a, and leg portions 27c extending linearly from each of these second contact portions 27b toward the surface of the backstay 25.

Therefore, the both end portions of the metal rod forming this movement limiting bar 27 become the distal end portions of the two leg portions 27c, and the distal end portions of these leg portions 27c are inserted into the holes formed in the backstay 25 from the surface side, and screw portions of those distal end portions are screwed with nuts on the back face side and fixed. Moreover, on the backstay 25, a spacer 29 for holding an interval of the rearing cage 1 arranged in the accommodation space portion 16 is detachably attached. This spacer 29 is, as obvious from FIGS. 2, 6, and 7, has a shape of a U-bolt which is well known as a mechanical element, for example, formed by bending one metal rod into a U-shape, both end portions 29a and 29b thereof are inserted into two holes opened at predetermined positions of the backstay 25 and detachably attached by being screwed with a nut from the back face side of the backstay 25. The two holes for attaching such spacer 29 to the backstay 25 are attaching portions.

Such attaching portion is opened in advance with two holes as one set at the position of the backstay 25 where this spacer 29 is arranged between the adjacent rearing cages 1S when the smaller rearing cages 1S are juxtaposed in the accommodation space portion 16. Therefore, if the larger rearing cage 1L is to be accommodated in the accommodation space portion 16, the spacer 29 is not attached to one attaching portion present at the expected accommodation position occupied by this rearing cage 1L and if it is attached in advance, it is removed.

Figure 8:
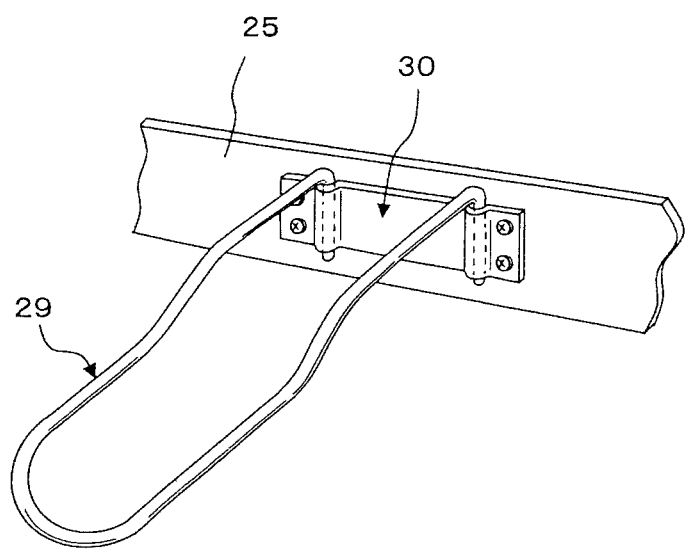
FIG. 8 is a perspective view illustrating another configuration diagram of an attaching portion which detachably attaches the spacer to the backstay.

In the embodiment illustrated in FIGS. 6 and 7, the attaching portion for mounting the spacer 29 to the backstay 25 is two holes into which the both end portions 29a and 29b of the spacer 29 are inserted, but since such attaching portions can be changed in various ways on the basis of the shape of the spacer 29, the structure is not limited to that of this embodiment. For example, if the spacer 29 formed by bending a metal rod into the U-shape and further bending the two end portions in the L-shape is to be used, a bracket 30 as illustrated in FIG. 8 can be used as the attaching portion. That is, this bracket 30 is formed of a plate member in which two grooves are formed on the back face, and by screwing and attaching this to the surface of the backstay 25, those grooves are covered by the surface of the backstay 25 and become holes for mounting, and by inserting the end portions bent in the L-shape into those holes, the spacer 29 can be detachably attached.

On the other hand, on the front side of the accommodation space portion 16, as illustrated in FIGS. 2 and 3, a pressing bar 31 extending in the width direction of the accommodation space portion 16 is installed in order to prevent removal of the accommodated rearing cage 1. This pressing bar 31 is also formed by bending one metal rod. Specifically, the pressing bar 31 is composed of a pressing portion 31a extending linearly in the width direction of the accommodation space portion 16 in the rack main body 11, an arm portion formed by bending substantially at a right angle in a crank state at the both sides thereof, and a support shaft 31b on the both end portions. Therefore, the support shafts 31b formed on the both end portions of the pressing bar are substantially in parallel with the pressing portion 31a, and this support shaft 31b is rotatably supported by a bearing 32 attached to the column 13a located on the both sides on the front side of the frame structural body 13 constituting the rack main body 11. As a result, the pressing portion 31a of the pressing bar 31 turns around the axis of the support shafts 31b on the both sides and with the length of the arm portion as a radius and gets close to and leaves away from the front wall 2c of the rearing cage 1 accommodated in the accommodation space portion 16. On the pressing portion 31a of the pressing bar 31, a stopper 31c is provided for stopping further turning if this pressing portion 31a is in a state close to the front wall 2c of the rearing cage 1.

This stopper 31c is formed by a rod material extending in a direction substantially orthogonal to the pressing portion 31a substantially at an intermediate position in the length in the width direction of the pressing portion 31a, and one end portion of this rod material is connected to the pressing portion 31a, while the other end portion is bent into the U-shape. The length from the one end portion to the U-shaped bent portion is the substantial length of this stopper 31c, and this length is determined such that when the pressing bar 31 is turned and the pressing portion 31a is brought into contact with the front wall 2c of the rearing cage 1 accommodated in the accommodation space portion 16, the U-shaped bent portion is brought into contact with the surface of the shelf plate 15. Even if the pressing bar 31 is turned when the rearing cage 1 accommodated in the accommodation space portion 16 is to be taken out of the rack main body 11, since the pressing portion 31a turns around the axes of the support shafts 31b on the both end portions with the length of the arm portion as the radius, there is no concern that the stopper 31c hits the rearing cage 1 accommodated in the accommodation space portion 16.

Subsequently, a use method of the rack apparatus 10 for managing laboratory animals according to the above-described embodiment will be described. First, a case where only the smaller rearing cage 1S is to be accommodated in the accommodation space portion 16 of the rack apparatus 10 for managing laboratory animals will be described. Since in the backstay 25, the attaching portion (attaching hole) is provided so that the spacer 29 is located between the rearing cages 1S assuming that only the smaller rearing cages 1S are accommodated in the accommodation space portion 16, the spacer 29 is attached to each of the attaching portions of this backstay 25. The attachment of the spacer 29 to the backstay 25 is performed outside the accommodation space portion 16 after removing the backstay 25 from the mount bracket 26. Then, a rearing manager carries the rearing cage 1S accommodating a laboratory animal in the cage main body 2 and places it by pushing it into each expected accommodation position of the accommodation space portion 16 from the front side of the rack device 10. When the rear wall 2c of the cage main body 2 in the rearing cage 1S gets close to the wall plate 12b of the casing 12 which is a rear surface plate of the accommodation space portion 16, the water drinking plug 18 relatively enters into the cage main body 2 from the receiving port formed in the rear wall 2c of the cage main body 2. After that, the first contact portion 27a of the movement limiting bar 27 hits the stack 3 formed on the rear wall 2c of the cage main body 2, and further accommodation movement of the rearing cage 1S is stopped.

The stack 3 provided on the cage main body 2 of each of the rearing cages 1S and 1L is formed closer to the corner in the front and rear walls 2c and the side walls 2d as described above, and the movement limiting bar 27 does not reach the either width of the accommodation space portion 16 due to a problem in attachment of the backstay 25 supporting this on the rear surface plate. Therefore, the rearing cage 1S accommodated on the both outermost sides of the accommodation space portion 16 is, as obvious from FIG. 2, only touched by the first contact portion 27a by the stack 3 closer to the center in the width direction of the accommodation space portion 16 formed on the rear wall 2c, and the stack 3 located outside in the width direction is departed from (is not brought into contact with) the first contact portion 27a. Then, regarding the rearing cage 1S accommodated on the both outermost sides of the accommodation space portion 16, the corner side located on the outside in the width direction of the accommodation space portion 16 goes into the depth of the accommodation space portion 16 and is slanted, and thus, the second contact portion 27b protruding forward from the first contact portion 27a directly hits the rear wall 2c of the cage main body 2 between the two stacks 3 formed on the rear wall 2c of the cage main body 2 and as a result, it is arranged in the organized aligned state similarly to the other rearing cages 1S, 1L and the like.

When the predetermined number of rearing cages 1S have been accommodated in the accommodation space portion 16, the pressing bar 31 attached to the front side of the rack main body 11 is turned, and when the stopper 31c attached to the pressing portion 31a hits the surface of the shelf plate 15, the turning of the pressing bar 31 is stopped, and the pressing portion 31a member substantially touches the front wall 2c of the rearing cage 1S accommodated in the accommodation space portion 16, whereby all the rearing cages 1S accommodated in the accommodation space portion 16 are pressed from the front side. As a result, each of the rearing cages 1S is sandwiched between the movement limiting bar 27 on the rear side and the pressing bar 31 on the front side and as a result, even if the rack device 10 wobbles due to an earthquake or the like, the rearing cage 1S does not drop from the shelf plate 15.

As described above, when the rearing cage 1 is contained in the accommodation space portion 16 of the rack main body 11, since the bottom plate 19a of the air discharge box 19 is located at a position extremely close to the open upper face 2a of the cage main body 2 in the rearing cage 1S, the air in the cage main body 2 is discharged through the air outlet 22 formed in the bottom plate 19a into the air discharge box 19 and is discharged to the outside through the air discharge chamber 12a. As a result, the pressure inside the cage main body 2 of the rearing cage 1S becomes negative and thus, clean air in the laboratory animal managing room R is supplied through the slight gap 24 between the cage upper cover 23 and the open upper face 2a of the cage main body 2 and the inside of the cage main body 2 is ventilated. At this time, since the gap 24 between the cage upper cover 23 and the open upper face 2a of the cage main body 2 is made extremely narrow, the clean air flows into the cage main body 2 through this gap 24 at a relatively high flow velocity.

As a result, since the clean air in the laboratory animal managing room R is taken in through the gap 24 between the cage upper cover 23 and the open upper face 2a of the cage main body 2 and an air flow flowing in a direction of the bottom portion 2b of the cage main body 2 and discharging contaminated air in the vicinity of the center in the cage main body 2 is established and thus, the air in the rearing cage 1 is ventilated effectively. Moreover, in this rack device 10, when the rearing cage 1S is contained in the accommodation space portion 16, the open upper face 2a of the cage main body 2 is in a state substantially closed by the air discharge box 19 and the cage upper cover 23, and thus, there is no concern that the contaminated air in the cage main body 2 goes into the animal managing room R through the gap 24.

When the animal reared in the rearing cage 1 contained in the accommodation space portion 16 of the rack device 10 is to be fed, when the reared animal is taken out of the rearing cage 1 or when the animal having been taken out of the rearing cage 1 is to be returned, the pressing bar 30 is turned to the front side so as to make movement of the rearing cage 1S to the front side possible, and the rearing cage 1S is pulled out of the accommodation space portion 16. Mixed accommodation of the smaller rearing cage 1S and the larger rearing cage 1L in the one accommodation space portion 16 as illustrated in FIG. 2 has been in demand. Thus, in the rack device 10 of this embodiment, the expected accommodation position for the larger rearing cage 1L is determined in advance, and at that time, the spacer 28 present at the expected accommodation position is taken out. As a specific procedure, the backstay 25 detachably supporting the spacer 28 is removed from the receiving groove 26b of the mount bracket 26 and taken out of the accommodation space portion 16, and the spacer 28 to be present at the expected accommodation position where the larger rearing cages 1S and 1L are to be accommodated is removed from the attaching portion. After that, the backstay 25 is returned to the original position, and the smaller rearing cage 1S and the larger rearing cage 1L are accommodated at the respective expected accommodation positions in the accommodation space portion 16 as expected.

As a result, according to the rack apparatus 10 according to this embodiment, only the smaller rearing cages 1S, only the larger rearing cages 1L or those larger and smaller rearing cages 1S and 1L in the mixed state can be easily accommodated in the one accommodation space portion 16 in an organized state. Moreover, even if the rack apparatus 10 wobbles due to an earthquake or the like, the rearing cages 1S and 1L accommodated in the accommodation space portion 16 do not drop from the shelf plate 15 but can be stored extremely safely. If the rack apparatus 10 is continuously used, dusts and the like adhere to and grow in the rack main body 11 and the air discharge chamber 12a. Such dusts adhere particularly markedly to a passage through which the air ventilating the inside of the rearing cage 1 flows such as the lower face of the cage upper cover 23 and the inside of the air discharge box 19, for example. Therefore, such portion needs periodic cleaning.

The lower face of the cage upper cover 23 can be cleaned relatively easily by removing the rearing cages 1S and 1L from the accommodation space portion 16. On the other hand, regarding the cleaning of the inside of the air discharge box 19, the rear-side wall plate of the casing 12 constituting the air discharge chamber 12a is removed, and a cleaning worker inserts the hand into the air discharge box 19 from inside the air discharge chamber 12a and performs cleaning. In that case, since the upper edge portion and the lower edge portion defining the opening portion of the air discharge box 19 opened toward the air discharge chamber 12a are formed by the plates 20 and 21 inclined so as to expand from the air discharge box 19 toward the air discharge chamber 12a, the cleaning worker can easily insert the hand into the air discharge box 19 and as a result, the cleaning work can be performed easily, and no injury is caused and thus, cleaning can be accomplished safely and rapidly. The above-described embodiment exemplifies an optimal example in the present invention and the present invention is not limited to these embodiments. The present invention includes various variations within a range not departing from the gist thereof.

REFERENCE SIGNS LIST

R laboratory animal managing room
1 rearing cage
2 cage main body
2a open upper face
10 rack apparatus for managing laboratory animal
11 rack main body
12 air discharge chamber
12a casing constituting air discharge chamber 12b wall plate (rear surface plate)
13 frame structural body
14 bottom plate
15 shelf plate
16 accommodation space portion
19 air discharge box
20, 21 inclined plate
22 air outlet
23 cage upper cover
24 gap
25 backstay
26 mount bracket
27 movement limiting member (movement limiting bar)
27a linear first contact portion
27b second contact portion protruding forward
28 pressing spring
29 spacer
30 attaching portion (attaching hole)
31 pressing member (pressing bar)

What is claimed is:

1. A rack apparatus for managing laboratory animals comprising:
a rack main body accommodating rearing cages, each containing a small animal for experiments, and
an air discharge chamber for discharging air in said rearing cages accommodated in the rack main body,
wherein said rack main body further comprises: at least one shelf plate extending in a width direction of the rack main body,
an accommodation space portion defined on said shelf plate so that a plurality of said rearing cages can be inserted from a front side to a rear side of said rack main body and can be juxtaposed and stored in said width direction of said rack main body,
a rear surface plate closing a rear side of said accommodation space portion,
a backstay positioned in said accommodation space portion, extending in said width direction of said rack main body, and detachably attached to said rear surface plate,
a plurality of attaching portions formed on said backstay,
a spacer detachably attached to said rack main body in said rear side of said accommodation space portion, and detachably attached to said attaching portions, for positioning the plurality of said rearing cages accommodated in said accommodation space portion at predetermined intervals in right and left width directions orthogonal to a direction defined by said front side and said rear side and for regulating movement in said width direction of said rack main body, and
an air discharge box installed on an upper part on the rear side of the accommodation space portion, formed over an entire lateral width of said rack main body, provided with an air outlet opened to said accommodation space portion, and
wherein said rear surface plate constituting said rack main body is a wall plate of a casing forming said air discharge chamber, a rear side of said air discharge box is connected to said wall plate of said air discharge chamber, via an opening peripheral portion, which is a connection portion allowing direct communication between said air discharge box and said air discharge chamber, formed as an inclined face so as to expand from said air discharge box toward said air discharge chamber.

2. The rack apparatus for managing laboratory animals according to claim 1, wherein said rack main body is provided with a movement limiting member attached to said backstay so as to be brought into contact with each said rearing cage and to regulate movement of each said rearing cage in said direction from said front side to said rear side and to arrange each said rearing cage at a fixed position.

3. The rack apparatus for managing laboratory animals according to claim 1 wherein a cage upper cover is attached to said rack main body, the cage upper cover being arranged close to an open upper face of each of the rearing cages and on said front side from said air discharge box, and a gap is formed between the cage upper cover and the open upper face through which air can be supplied to each of the rearing cages.

4. The rack apparatus for managing laboratory animals according to claim 1 wherein said rack main body is provided with a plurality of pressing bars, each pressing bar extending in said width direction of said main rack body in order to prevent a plurality of said rearing cages from movement towards said front side, and each said pressing bar is attached to said rack main body and is capable of turning by having each end portion thereof rotatably supported by a fixing portion located on outer side portions in said width direction of said rack main body.

5. The rack apparatus for managing laboratory animals according to claim 1 wherein
said rack main body further comprises:
a cage upper cover being arranged close to an open upper face of each of said rearing cages on said front side from said air discharge box, and a gap is formed between the cage upper cover and the open upper face through which air can be supplied to each of the rearing cages, and
a plurality of pressing bars, each pressing bar extending in said width direction of said main rack body in order to prevent a plurality of said rearing cages from movement towards said front side,
each said pressing bar is attached to said rack main body and is capable of turning by having each end portion thereof rotatably supported by a fixing portion located on outer side portions in said width direction of said rack main body.

6. The rack apparatus for managing laboratory animals according to claim 5, wherein a movement limiting member is attached to said backstay so as to be brought into contact with each said rearing cage and to regulate movement of each said rearing cage in a direction from said front side to said rear side and to arrange each said rearing cage at a fixed position.

\* \* \* \* \*